US010924880B1

(12) United States Patent
Sokolov et al.

(10) Patent No.: US 10,924,880 B1
(45) Date of Patent: Feb. 16, 2021

(54) GEOFENCING AND ALERTING AROUND OBJECTS WITH VERIFIED ATTRIBUTES

(71) Applicant: NortonLifeLock Inc., Tempe, AZ (US)

(72) Inventors: Ilya Sokolov, Boston, MA (US); Keith Newstadt, West Newton, MA (US)

(73) Assignee: NORTONLIFELOCK INC., Tempe, AZ (US)

(*) Notice: Subject to any disclaimer, the term of this patent is extended or adjusted under 35 U.S.C. 154(b) by 0 days.

(21) Appl. No.: 15/434,602

(22) Filed: Feb. 16, 2017

(51) Int. Cl.
*H04W 4/021* (2018.01)
*H04W 4/02* (2018.01)
*H04W 4/80* (2018.01)
*H04W 84/12* (2009.01)

(52) U.S. Cl.
CPC .......... *H04W 4/021* (2013.01); *H04W 4/023* (2013.01); *H04W 4/80* (2018.02); *H04W 84/12* (2013.01)

(58) Field of Classification Search
CPC ..... H04W 4/021; H04W 4/023; H04W 84/12; H04W 4/008; H04W 4/80
USPC ................ 455/412.2, 410–411, 414.1–414.2, 455/456.1–457
See application file for complete search history.

(56) References Cited

U.S. PATENT DOCUMENTS

| | | | | |
|---|---|---|---|---|
| 9,473,890 | B1* | 10/2016 | Liu .................... | H04W 52/0241 |
| 2012/0284769 | A1* | 11/2012 | Dixon ................. | H04W 4/021 726/1 |
| 2013/0217332 | A1* | 8/2013 | Altman ................. | H04W 12/04 455/41.2 |
| 2015/0099550 | A1* | 4/2015 | Alharayeri ............. | H04L 51/00 455/456.3 |
| 2016/0142409 | A1* | 5/2016 | Frei ...................... | H04L 63/0884 713/176 |
| 2017/0366931 | A1* | 12/2017 | Rajala ................... | H04W 4/021 |

* cited by examiner

*Primary Examiner* — Michael Y Mapa
(74) *Attorney, Agent, or Firm* — FisherBroyles, LLP

(57) ABSTRACT

The present disclosure includes a method for maintaining a dynamic geofence. The method receives a set of digital IDs and data pairs from a monitored user credential. Each digital ID was received by the monitored user credential as part of a wireless transmission from a node device, and each digital ID includes one or more attributes. The method retrieves a user policy that includes a required attribute and a threshold distance. The method determines whether at least one of the digital IDs includes an attribute matching the required attribute, and verifies any digital id containing the attribute matching the required attribute. The method determines the distance between the monitored user credential and the node device using the data paired with the digital ID, and determines whether the distance between the monitored user credential and the node device is less than the threshold distance.

20 Claims, 8 Drawing Sheets

GEOFENCING AND ALERTING AROUND OBJECTS WITH VERIFIED ATTRIBUTES

BACKGROUND

Field

Embodiments of the present invention generally relate to a geofencing, and more specifically to establishing and monitoring geofences using proximity of the a target to objects with verified attributes.

Description of the Related Art

Generally, a geofence is a virtual boundary applied to a real-world geographic area. Geofences are defined using a set of predefined boundaries, such as streets acting as boundaries to define a group of city blocks within the geofence. Geofences can also be defined by specifying a distance from a predefined location, i.e., within 1000 feet of a school. An individual subject to the geofence is monitored using a location based system, such as GPS coordinates, to determine whether the individual is within the geofence area. An administrator is alerted when the individual leaves the geofence area.

Geofencing can be used to monitor prisoners or other individuals under house arrest to notify law enforcement officers if the individual leaves their home. Geofencing can be used to monitor the elderly, such as dementia patients, who cannot safely leave a managed care facility. Geofencing can also be used to ensure that children remain supervised by ensuring the children are at school, i.e., the child's location is within a radius of the school building. Geofencing, however, is limited by the static nature of the virtual boundaries, which can cause unnecessary notifications to be sent to administrators. For example, if the dementia patient is escorted to lunch by family members, the geofence would need to be disabled first, or the administrator would receive a false alarm when the patient left the facility. Further, if the patient wanders away from the family while at lunch, the geofence administrator would not be notified. Thus, there exists a need for dynamic geofences defined with reference to movable nodes rather than static boundaries.

SUMMARY

One embodiment of the present disclosure includes a method for maintaining a dynamic geofence. The method receives a set of digital IDs and data pairs from a monitored user credential. Each digital ID was received by the monitored user credential as part of a wireless transmission from a node device, and each digital ID includes one or more attributes. The method retrieves a user policy that includes a required attribute and a threshold distance. The method determines whether at least one of the digital IDs includes an attribute matching the required attribute, and verifies any digital id containing the attribute matching the required attribute. The method determines the distance between the monitored user credential and the node device using the data paired with the digital ID, and determines whether the distance between the monitored user credential and the node device is less than the threshold distance.

Another embodiment provides a computer-readable storage medium having instructions, which, when executed on a processor, operates to maintain a dynamic geofence. The operation receives a set of digital IDs and data pairs from a monitored user credential. Each digital ID was received by the monitored user credential as part of a wireless transmission from a node device, and each digital ID includes one or more attributes. The operation retrieves a user policy that includes a required attribute and a threshold distance. The operation determines whether at least one of the digital IDs includes an attribute matching the required attribute, and verifies any digital id containing the attribute matching the required attribute. The operation determines the distance between the monitored user credential and the node device using the data paired with the digital ID, and determines whether the distance between the monitored user credential and the node device is less than the threshold distance.

Still another embodiment of the present invention includes a processor and a memory storing a program, which, when executed on the processor, performs an operation for maintaining a dynamic geofence. The operation receives a set of digital IDs and data pairs from a monitored user credential. Each digital ID was received by the monitored user credential as part of a wireless transmission from a node device, and each digital ID includes one or more attributes. The operation retrieves a user policy that includes a required attribute and a threshold distance. The operation determines whether at least one of the digital IDs includes an attribute matching the required attribute, and verifies any digital id containing the attribute matching the required attribute. The operation determines the distance between the monitored user credential and the node device using the data paired with the digital ID, and determines whether the distance between the monitored user credential and the node device is less than the threshold distance.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

FIG. 10 illustrates the dynamic nature of the geofence area, according to an embodiment.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1A:
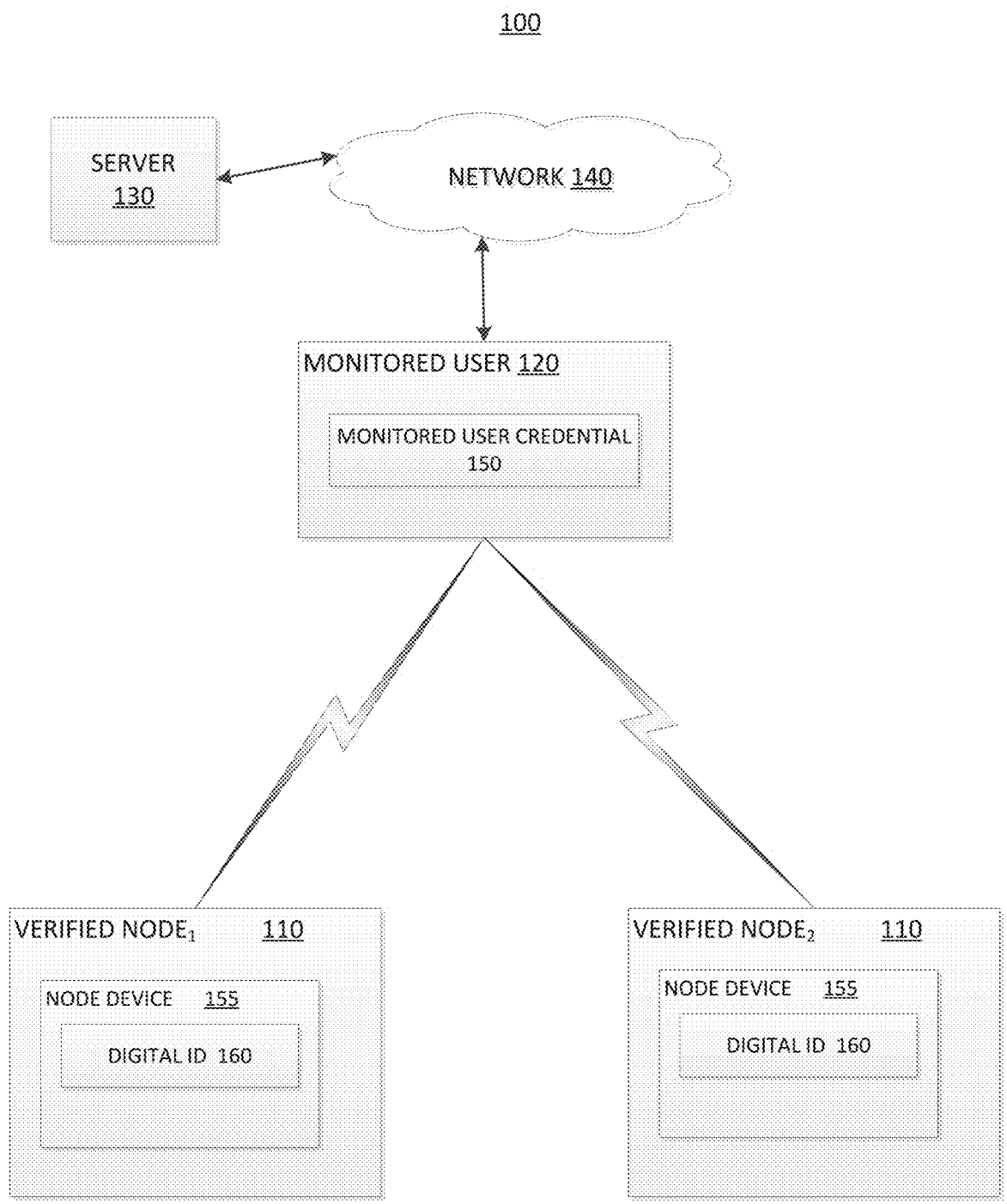
FIG. 1A illustrates an example system for establishing and monitoring geofences, according to one embodiment.

Generally, geofences are defined using static landmarks, such as streets defining an area or a building defining an origin that the subject must stay within a specified distance of, but these geofences are not flexible enough to accommodate allowable activities that will take the monitored person outside the static geofence. For example, a geofence defined as a radius around a child's school or a patient's care facility cannot accommodate the child going on a class field trip or the patient's family taking the patient to lunch, to the doctor, etc. These semi-regular activities that breach traditional geofences cause unnecessary false alarm notifications be sent to the policy administrator. When the frequency of false alarm notifications grows too large, the administrator can be forced to enlarge the geofence such that it no longer acts as a restriction, or the administrator may disable the geofence altogether.

Embodiments presented here provide techniques for establishing and maintaining dynamic geofences. The system establishes the dynamic geofence using one or more nodes, i.e., people, structures, or other things, equipped with a device that wirelessly transmits a digital ID that includes verified attributes of the node. The geofence is established by requiring the monitored person to be within a threshold distance of a node having one or more verified attributes set in a geofence policy. Rather than defining a child's geofence requiring the child be within a radius of a school building, the dynamic geofence can require that the child be within a threshold distance of a node with the verified attribute of "teacher." Therefore, the geofence is defined by the relative distance to a node with a verified attribute, rather than being defined by a distance from a static point. By defining the geofence with nodes possessing particular verified attributes, the system allows a monitored individual to seamlessly move from one node to the next, without triggering a false alarm for the administrator. For example, a child's dynamic geofence could require the child to be within 100 feet of a "caregiver" during working hours. The child's authorized caregivers would include teachers at the child's school, coaches on the child's extra-curricular sports team, and baby-sitter or after-school program administrators. With the dynamic geofence, the child is dropped off for school in the morning—within range of teachers—the child meets a soccer coach and travels to a soccer game, all within range of the soccer coach, before returning to school to be picked up. In this example, the child would not violate the geofence rules because the child is near a "caregiver" the entire time. Even if the location of the soccer game was not known ahead of time, or is unexpectedly changed, the dynamic geofence would not trigger a false alarm so long as the child remained with the coach. Further, the policy defining the dynamic geofence can specify a number of verified attributes that must be present during specified time periods, further increasing the flexibility of the system.

The system establishes the dynamic geofence using a monitored user credential carried by the individual subject to the geofence and one or more verified nodes. The monitored user credential can be a smart phone or a dedicated electronic device such as an electronic wearable device. The attributes of each verified node are included in a cryptographically secure digital ID issued by the system server or by another trusted third party. The server verifies the attributes asserted by individuals acting as verified nodes prior to creating the digital ID. The digital ID of a verified node is transmitted by a node device, such as a smart phone or dedicated electronic device, into the surrounding area. The monitored user credential detects digital IDs being transmitted by nearby node devices, and the monitored user credential periodically provides a list of detected digital IDs to a server to verify that the monitored user credential is within range of digital IDs including all of the geofence policy's required attributes. The system determines distance between a monitored user credential and a node device broadcasting a digital ID by evaluating the signal strength received by the monitored user credential, by comparing GPS coordinates, or both.

FIG. 1A illustrates a system for establishing and monitoring geofences, according to an embodiment. As shown, system 100 includes one or more verified nodes 110, a monitored user 120, and a server 130 that communicate using network 140. Monitored user 120 is an individual subject to the geofence maintained by the system 100. The geofence is an area defined by an administrator that the monitored user 120 cannot leave without the administrator receiving a notification. The system 100 uses a monitored user credential 150 carried by the monitored user 120 and a node device 155 with a digital ID 160 carried by each verified node 110 to define and enforce the geofence rules in a user policy. Specifically, the geofence is defined using one or more verified attributes that must be present within a threshold distance from the monitored user 120. The geofence rules can set forth, for example, the number of individuals that need to be detected, the verified attributes those individuals need to possess, and times/days when each rule applies. Thus, the geofence rules in the user policy can specify N individuals that each need to possess Y verified attribute during a specific time period.

For example, a dynamic geofence for a child can be established by requiring two teachers from the child's school be within 100 feet of the child. In this example, each teacher is a verified node 110 with a digital ID 160 that includes the attributes that the person's job is a teacher, and the person's place of employment is the child's school. The node device 155 for a teacher transmits the digital ID 160 into the local area around the teacher, i.e., a verified node 110, as part of a near-field wireless signal. The monitored user credential 150 detects wireless signals carrying digital IDs 160 from node devices 155 in the local area. In some embodiments, monitored user credential 150 establishes a persistent wireless connection with the node device 155, while in other embodiments, monitored user credential 150 received periodic broadcasts from node devices 155.

Figure 1B:
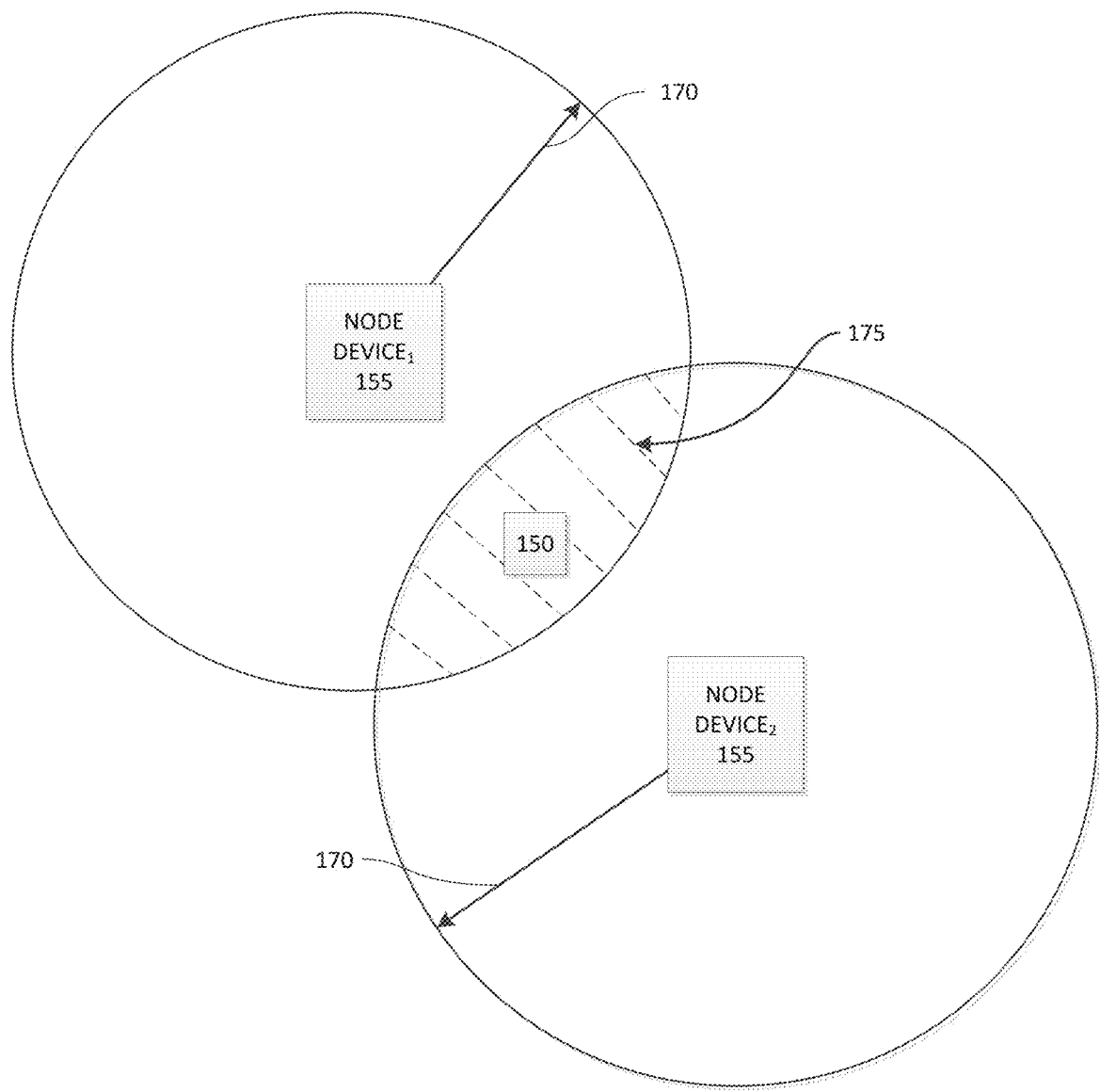
FIG. 1B illustrates an overhead view of a dynamic geofence area, according to an embodiment.

FIG. 1B illustrates a dynamic geofence area according to an embodiment. As shown, node device$_1$ 155 and node device$_2$ 155 each transmit a digital ID into the local area within a radius 170 of each respective node device. Continuing the example, if the digital ID of node device$_1$ and node device$_2$ each include the verified attributes of "job" as teacher and "place of employment" as XYZ Elementary, then the geofence area is the overlapping area of the two transmission areas, shown as cross-hatched area 175 that includes the monitored user credential 150. If the user policy is modified to require only one digital ID, instead of two, then the geofence area includes transmission areas of both node device$_1$ and node device$_2$.

Figure 1C:
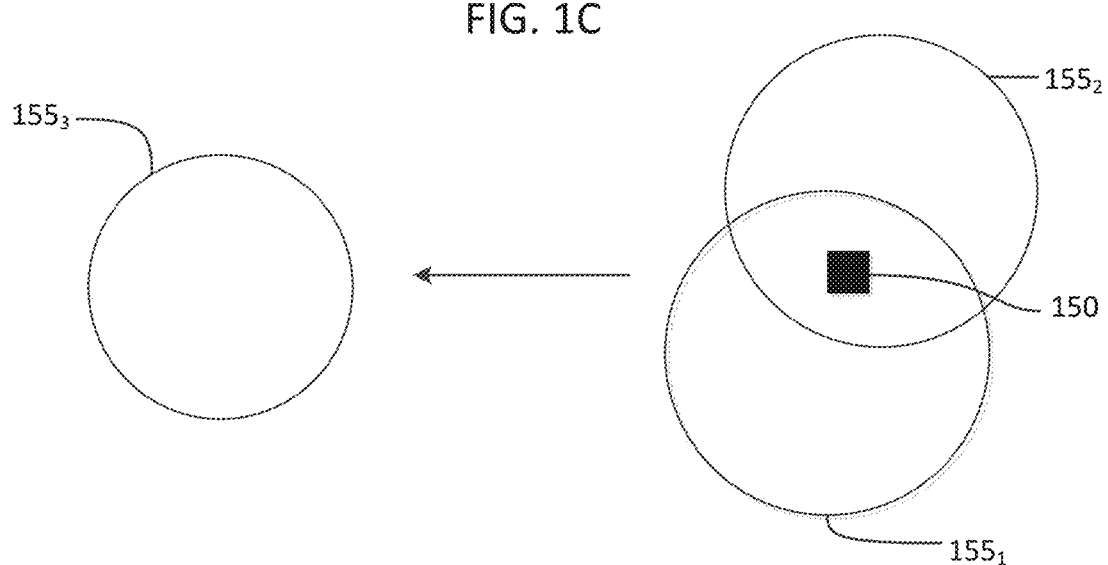
FIG. 1D illustrates the dynamic nature of the geofence area, according to an embodiment.
FIG. 1E illustrates the dynamic nature of the geofence area, according to an embodiment.
Figure 1D:
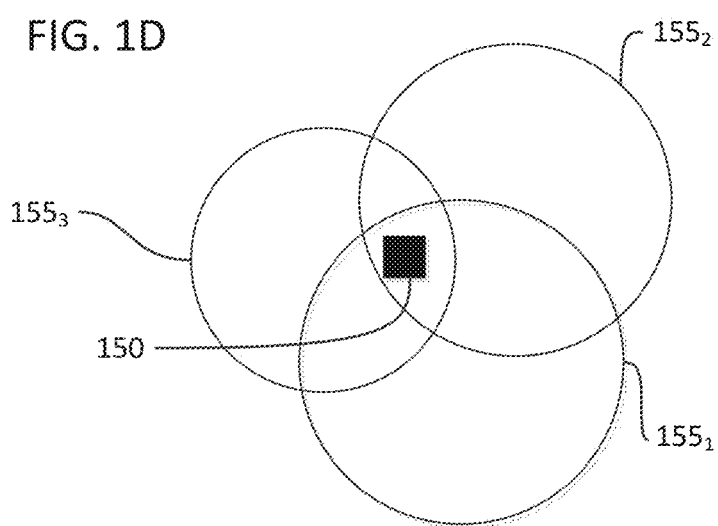
Figure 1E:
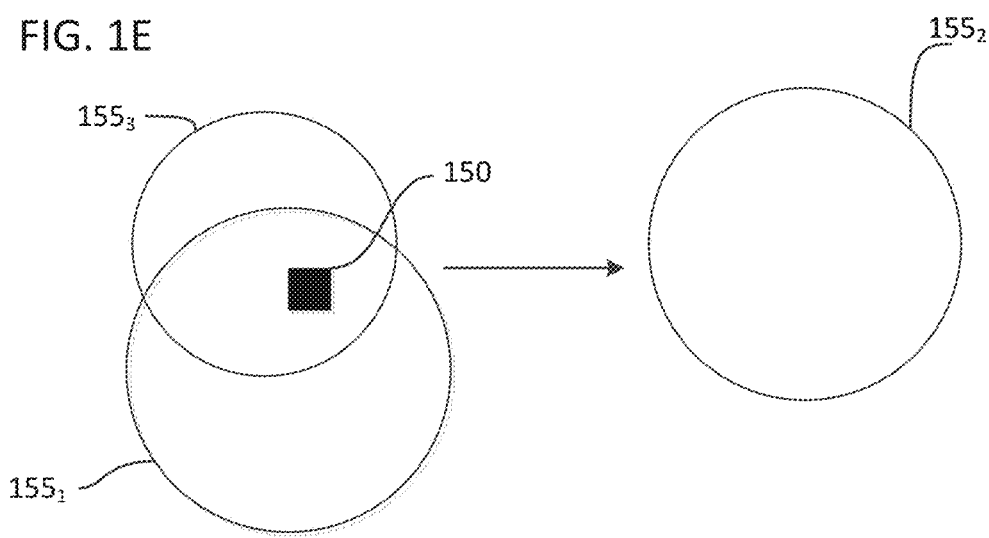

FIGS. 1C, 1D, and 1E further illustrates the dynamic nature of the geofence area according to an embodiment. As shown in FIG. 1C, monitored user credential 150 is within transmission range of node device 155$_1$ and node device 155$_2$, such as, for example, when a child is being escorted by two school staff with digital IDs having the required attributes. Node device 155$_1$, node device 155$_2$, and monitored user credential 150 are moving toward node device 155$_3$. As shown in FIG. 1D, when node device 155$_1$, node device 155$_2$, node device 155$_3$ and monitored user credential 150 converge the goefence policy is maintained as the monitored user credential 150 remains within range of two appropriate digital IDs. At this point, any one of node device 155$_1$, node device 155$_2$, and node device 155$_3$ can satisfy the geofence policy, so any one of the node devices can move away. As shown in FIG. 1E, monitored user credential 150 remains within range of node device 155$_1$, and node device 155$_3$, while node device 155$_2$ has move out of range. Thus, the dynamic geofence moves with node devices 155, alleviating problems inherent in static geofences. The monitored user credential 150 also evaluates the signal strength of the wireless signal transmitting a digital ID 160 and associates the signal strength the digital ID 160. Monitored user credential 150 sends the digital ID 160, which includes verified attributes, and associated data such as the signal strength to server 130 through network 140.

Server 130 determines whether the verified attributes required by the dynamic geofence policy have been met by comparing the verified attributes in the digital IDs 160 detected by monitored user credential 150 to the required attributes in the dynamic geofence policy. If each of the verified attributes in the geofence policy was not detected by the monitored user credential 150, then server 130 sends a breach notification to the administrator of the dynamic geofence. When the monitored user credential 150 has detected digital IDs 160 that include each of the verified attributes in the geofence policy, server 130 determines whether the distance requirement in the geofence policy has been met. Server 130 determines the distance between a node device 155 and the monitored user credential 150 using the signal strength associated with the digital ID 160 wireless signal, GPS coordinates associated with the digital ID 160, or both.

Figure 2:
FIG. 2 illustrates a block diagram of a credential for a monitored user of the system, according to an embodiment.

FIG. 2 is a block diagram illustrating a monitored user credential of the system, according to an embodiment. Monitored user credential 150 includes a near-field transceiver 200, a digital ID collection 210, a network agent 220, and a GPS receiver 230. Monitored user credential 150 uses the near-field transceiver 200 to detect wireless signals from node devices 155 in the local area. Near-field transceiver 200 can be configured to use one or more near-field transmission protocols, such as, by way of example, peer-to-peer systems such as Bluetooth® or Bluetooth® low energy, local area networking protocols, such as WiFi® systems based on the IEEE 802.11 standards, or equivalent proprietary wireless communication protocols. Monitored user credential 150 receives the digital ID 160 from a node device 155 when a wireless signal is detected, and monitored user credential 150 associates the signal strength of the wireless signal with the digital ID 160. Monitored user credential 150 stores received digital IDs 160 and associated data, such as signal strength, GPS coordinates, or local WiFi device signals, in digital ID collection 210. Monitored user credential 150 uses network agent 220 to communicate the digital IDs 160 and associated data to server 130. Monitored user credential 150 uses GPS receiver 230 to receive GPS coordinates of the monitored user credential 150. In an embodiment, system 100 compares GPS coordinates of the monitored user credential 150 to GPS coordinates of node devices 155 to determine the distance between the two devices.

Figure 3:
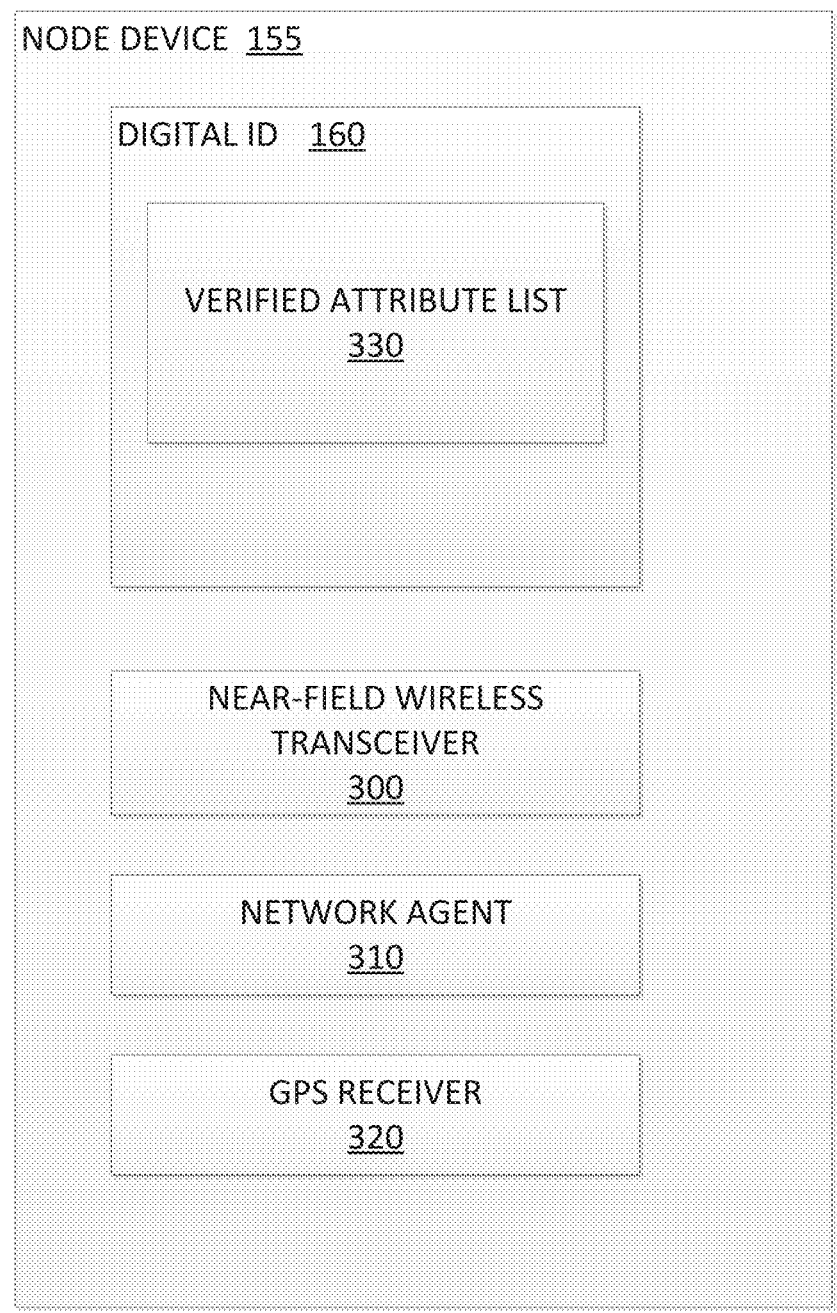
FIG. 3 illustrates a block diagram of a node credential of the system, according to one embodiment.

FIG. 3 is a block diagram illustrating a node device 155 of the system, according to an embodiment. Node device 155 includes a digital ID 160, a near-field wireless transceiver 300, a network agent 310, and a GPS receiver 320. Digital IDs 160 are used by the system 100 to determine whether the monitored user 120 is adhering to the geofence policy defined by the system administrator. The geofence policy defines the boundaries of the dynamic geofence using one or more verified attributes the must be within a set distance of the monitored user 120. A digital ID 160 includes a verified attribute list 330 containing values for attributes of the verified node 110. Thus, digital IDs 160 are used to define an area around a the verified node 110 that is within the dynamic geofence for monitored users 120 whose policy requires the verified attributes of that verified node 110.

For example, a dynamic geofence policy for a child attending school at XYZ Elementary can require that two teachers from the child's school be within 100 feet of the child during school hours. Such a geofence policy can be expressed as requiring two separate digital IDs 160 each having a verified attribute of "job" with a value of "teacher" and a verified attribute of "place of work" with a value of "XYZ Elementary." Each employee at XYZ Elementary obtains their own digital ID 160 from server 130, or, alternatively, a trusted third party who has verified that the information supplied by the employee about each attribute. The employee's node device 155 broadcasts the digital ID 160 wirelessly into the surrounding area. Thus, the child's monitored user credential 150 would detect the digital ID 160 broadcast by the node device 155 of a nearby teacher. The node device 155 can be smart phone or a dedicated electronic device.

In an embodiment, node device 155 uses network agent 310 to communicate with server 130. Node device 155 uses GPS receiver 320 to obtain GPS coordinates of the node device 155 that can be used to determine the distance from the node device 155 to a monitored user credential 150. Node device 155 can communicate GPS coordinates to server 130, with or without digital ID 160, using network agent 310. Alternatively, node device 155 can transmit GPS coordinates with digital ID 160 using near-field wireless receiver 300.

In an embodiment, node device 155 communicates digital ID 160 and GPS coordinates to server 130 via network agent 310, and monitored user credential 150 communicates GPS coordinates for the monitored user 120 to server 130 via network agent 230. Server 130 uses the GPS coordinates from node device 155 and monitored user credential 150 to enforce the user policy defining the dynamic geofence. That is, server 130 determines, using GPS coordinates, whether the monitored user credential is within range of node devices 155 with digital IDs 160 having the required attributes. In this embodiment, monitored user credential 150 does not need to detect the digital IDs via near-field wireless because the location and digital ID attributes are communicated to server 130 via network 140. In a further embodiment, server 130 can enforce the dynamic geofence using a combination of digital IDs 160 and GPS coordinates received via network 130 and digital IDs 160 and associated data detected by monitored user credential 150.

In an embodiment, server 130 verifies asserted attributes from verified nodes 110, such as an individual, requesting a digital ID 160. The individual provides supporting information that server 130 uses to verify the asserted attributes. In an embodiment, the supporting information can be a form of two-factor authentication, such as, for example, verifying access to an active email address of a business entity and providing a security token generated from by an application or device associated with the business entity. For example, a teacher would provide their email address with a domain from XYZ Elementary and an authentication code generated by a security token. The security token can be an application running on a computer or smart phone, or a dedicated device such as a USB dongle. The security token generates an authentication code at fixed intervals, i.e., every minute, using a secret seed number for an authentication code generator algorithm. Server 130 compares the authentication code from the teacher with an authentication code generated by server 130, or by a server associated with XYZ Elementary. In an alternative embodiment, server 130 verifies the asserted attributes by accessing a database with relevant information, such as a database containing human resources data, professional license databases, or government databases.

Figure 4:
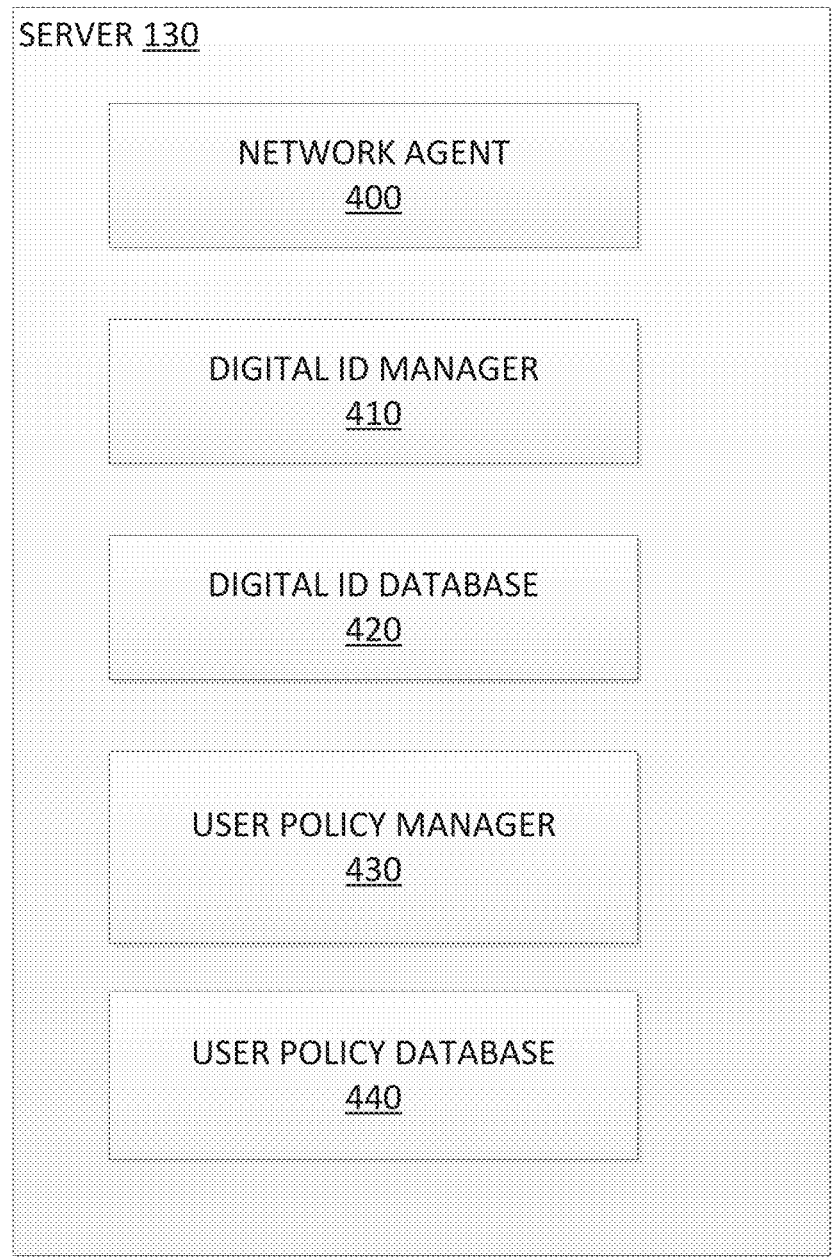
FIG. 4 illustrates a credential server of the system, according to one embodiment.

FIG. 4 is a block diagram illustrating a server 130 of the system, according to an embodiment. Server 130 includes network agent 400, digital ID manager 410, digital ID database 420, user policy manager 430, and user policy database 440. Server 130 uses network agent 400 to send and receive information over network 140. Server 130 uses digital ID manager 410 to create digital IDs 160 and to validate digital IDs 160 received by the monitored user credential 150.

In an embodiment, digital ID manager 410 creates a digital ID 160 by first verifying the asserted attributes received with the request to create a digital ID 160. Once the asserted attributes have been verified, digital ID manager 410 creates the digital ID as a cryptographically secure object that cannot be duplicated by a person who intercepts the signal carrying the digital ID 160. For example, digital ID manager 410 can use a digital signature to ensure the digital ID 160 is authentic. To create a digital signature, digital ID manager 410 takes the information in the digital ID, i.e., a message including the verified attributes and any other data, and computes a signature for the message using a private key known only to the digital ID manager 410. The digital ID manager 410 transmits the message and the signature together as the digital ID 160 object to the person who requested the digital ID 160. Digital ID manager 410 provides a verification function that uses a public key. The verification function uses the message and the signature as inputs and will return a "true" value if the signature was created using the digital ID manager's 410 private key, and "false" if it was not. Digital ID manager 410 makes the public key available to entities that need to verify the digital ID. In an embodiment, digital ID manager 410 uses more than one private key/public key pair to create digital IDs 160, such as using a different pair of keys for each client. In this embodiment, digital ID manager 410 stores the private key, public key, and associated metadata in digital ID database 420.

Server 130 uses user policy manager 430 to create a user policy defining the dynamic geofence. User policy manager 430 receives input from a geofence administrator that defines the geofence elements, including required attributes and a distance threshold for each attribute, as well as any detection frequency, times of day, or other limitations on when attributes are required. The user policy will also include authentication credentials for the administrator and contact information that can be used to send a notification when the policy is breached. User policy manager 430 stores the user policies in user policy database 440.

Figure 5:
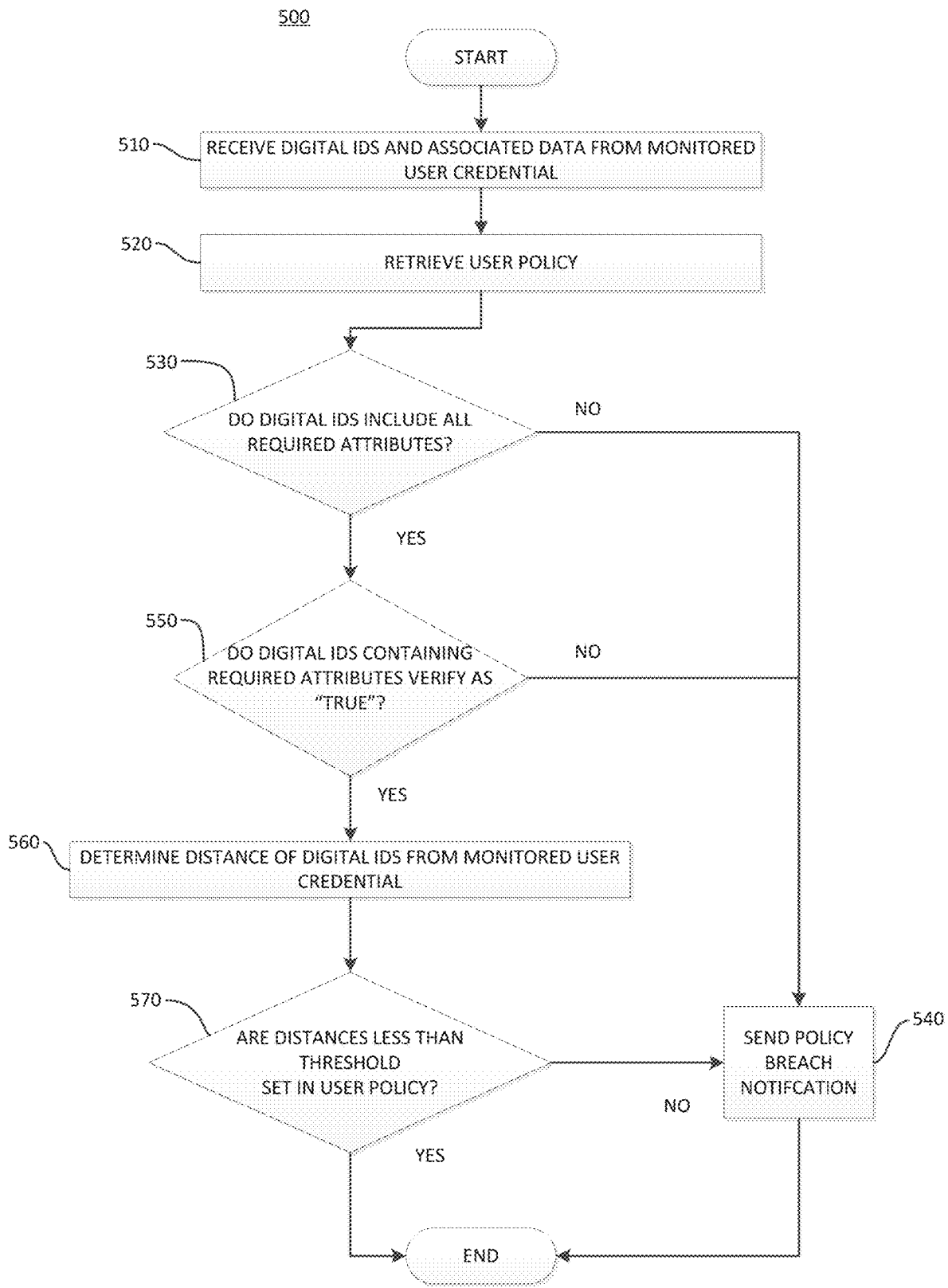
FIG. 5 is a flow chart illustrating a process for enforcing a dynamic geofence, according to one embodiment.

FIG. 5 is a flowchart illustrating a process for enforcing a dynamic geofence, according to an embodiment. As illustrated, the process 500 begins at step 510, where server 130 receives the digital IDs 160 and associated data detected by monitored user credential 150. Server 130 retrieves the user policy associated with the monitored user 120 and monitored user credential 150 in step 520. In step 530, server 130 compares the verified attributes in the collection of digital IDs 160 received from the monitored user credential 150 with the required attributes in the user policy. If each of the required attributes from the policy are not present in the collection of digital IDs 160, then the process moves to step 540, where sever 130 sends notification to the administrator that the policy has been breached. If each of the required attributes are present in the collection of digital IDs 160, then server 130 proceeds to step 550 and validates the each digital ID 160 to ensure the verified attributes are authentic. If a digital ID 160 including one of required attributes does not verify as "true," then the server 130 proceeds to step 540 and sends a breach notification to the administrator of the policy. If the digital IDs 160 including the required attributes are successfully verified, then server 130 moves to step 560 where server 130 determines the distance of each digital ID 160 from the monitored user credential 150.

Server 130 uses signal strength, GPS coordinates, WiFi signal strengths, alone or in combination, from the associated data for each digital ID 160 to determine the distance between the monitored user credential 150 and the digital ID 160. That is, server 130 evaluates the strength of the near-field signal carrying the digital ID 160 received by the monitored user credential 150 to determine the distance between the node device 155 transmitting the digital ID 160 and the monitored user credential 160. In an embodiment, server 130 uses GPS coordinates to determine the distance between the monitored user credential 150 and each node device 155 transmitting a digital ID 160. In this embodiment, server 130 receives GPS coordinates of the monitored user credential 150 in the associated data. Server 130 can receive GPS coordinates for the node device 155 directly from the node device 155 via network 140. In an embodiment, server 130 uses WiFi signal strengths to triangulate the location of the monitored user credential 150, the node device 155, or both. Alternatively, GPS coordinates of the node device 155 can be transmitted with the digital ID 160, which allows the monitored user credential 150 to receive the node device 155 GPS coordinates and provide the GPS coordinates to server 130 within the associated data.

After server 130 has determined the distances between each digital ID 160 and the monitored user credential 150, server 130, at step 570, determines whether the distance from the monitored user credential 150 to the digital ID 160 containing each required attribute is less than a threshold value set in the user policy. If each required attribute is satisfied by a digital ID closer than the threshold distance, then the monitored user 120 is within the dynamic geofence and the process ends. If not, then server 130 proceeds to step 540, and sends a notification to the policy administrator. Server 130 performs process 500 periodically, as defined in the user policy, to ensure that monitored user 120 remains within the dynamic geofence.

In an alternative embodiment, monitored user credential 150 performs one or more of the steps in process 500. For example, monitored user credential 150 can retrieve the user policy from server 130 via network 140 to perform step 520. Monitored user credential 150 can then perform steps 530, 550, 560, and 570, communicating any failure to server 130 to execute step 540.

Figure 6:
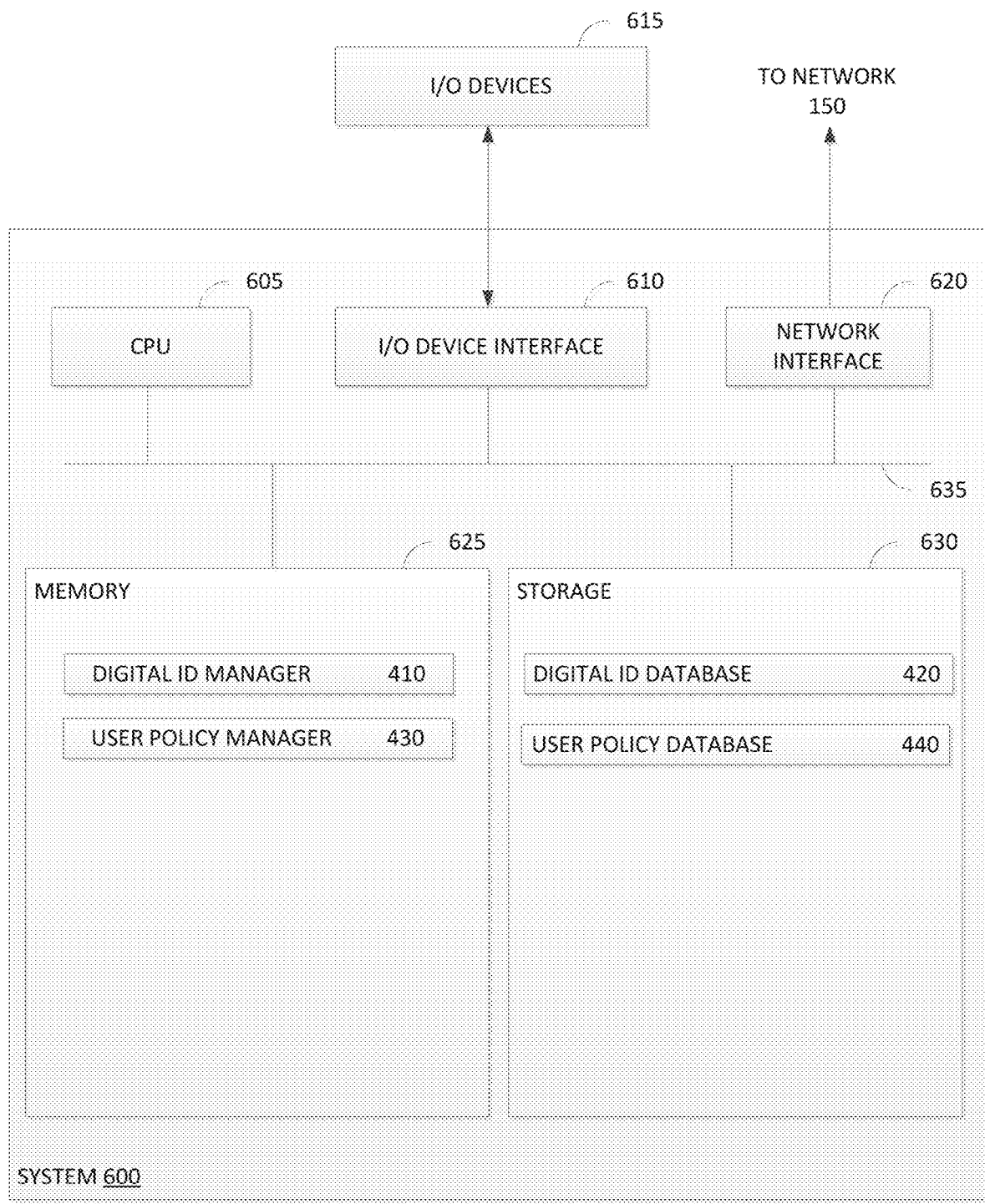
FIG. 6 illustrates an example computing system for maintaining a dynamic geofence, according to one embodiment.

FIG. 6 illustrates an example computing system for establishing and enforcing a dynamic geofence. As shown, the system 600 includes, without limitation, a central processing unit (CPU) 605, one or more I/O device interfaces 610 which may allow for the connection of various I/O devices 615 (e.g. keyboards, displays, mouse devices, pen inputs, etc.) to the system 600, network interface 620, a memory 625, storage 630, and an interconnect 635.

CPU 605 may retrieve and execute programming instructions stored in the memory 625. Similarly, the CPU 605 may retrieve and store application data residing in memory 625. The interconnect 635, transmits programming instructions and application data, among the CPU 605, I/O device interface 610, network interface 620, memory 625, and storage 630. CPU 605 is included to be representative of a single CPU, multiple CPUs, a single CPU having multiple processing cores, and the like. Additionally, the memory 625 is included to be representative of a random access memory. Furthermore, the storage 630 may be a disk drive, solid state drive, or a collection of storage devices distributed across multiple storage systems. Although shown as a single unit, the storage 630 may be a combination of fixed and/or removable storage devices, such as fixed disc drives, removable memory cards or optical storage, network attached storage (NAS), or a storage area-network (SAN).

As shown, memory 625 includes a digital ID manager 410, and a user policy manager 430. Digital ID manager 410 is configured to create and verify digital IDs for verified nodes that can establish a dynamic geofence. Digital ID manger 410 receives a request for a digital ID from network 140 via network interface 620. The request for a digital ID includes one or more asserted attributes and supporting information. Digital ID manager 410 verifies the asserted attributes using the supporting information, such as, for example, using a two-form authentication procedure, or by accessing a related database using network interface 620. When the asserted attributes are successfully verified, digital ID manager 410 creates a digital ID by generating a digital signature of message that includes the asserted attributes and the verified values using the digital ID manager's 410 private key. The digital ID manager 410 communicates the digital ID, the verified attributes and values and the digital signature, to the individual via network interface 620. Digital ID manger 410 stores the digital ID and a public key used to verify the digital ID in the digital ID database 420 maintained in storage 630.

User policy manager 430 is configured to create and enforce dynamic geofences. User policy manager 430 creates a user policy for each dynamic geofence, including one or more required attributes, a threshold distance for each required attribute, administrator contact information, and administrator authentication credentials. User policy manager 430 receives the user policy information from an administrator either from one or more I/O devices 615 through I/O device interface 610, or via network 140 through network interface 620. User policy manager 430 stores each user policy in user policy database 440 maintained in storage 630.

To enforce the dynamic geofence, user policy manager 430 receives a digital ID collection from the monitored user credential of the monitored user. The user policy manager 430 retrieves the user policy corresponding to the monitored user and determines if each of the required attributes from the policy are present in the digital IDs. If not, then user policy manager 430 sends a notification to the policy administrator using network interface 620. If each of the required attributes are present, then user policy manager 430 provides the digital IDs to digital ID manager 410 for verification. Digital ID manager 410 verifies the digital IDs by using the public key of the entity that created the digital signature. When digital ID manager 410 created the digital ID, digital ID manager 410 performs the verification using the corresponding data stored in digital ID database 420. If another trusted third party created the digital ID, then digital ID manager 410 retrieves the public key used by the trusted third party via network interface 620 and uses the public key to verify the digital signature. Digital ID manager 410 communicates the results of each digital ID verification to user policy manager 430. When the digital IDs with required attributes are not successfully verified, user policy manager 430 sends a notification to the policy administrator. If the digital IDs are successfully verified, user policy manager 430 determines whether each digital ID is within the threshold distance for any required attributes included in the digital ID. User policy manager 430 determines the relative distance by evaluating a signal strength associated with the digital ID, by comparing GPS coordinates, or both. User policy manager 430 sends a notification to the policy administrator when the threshold distance between a digital ID and the monitored user credential for any required attribute is exceeded. When the required attributes thresholds are not exceeded, the monitored user is complying with the dynamic geofence policy and the process is complete. User policy manager 430 repeats the policy verification process periodically at pre-defined intervals or as set forth in the user policy.

Note, descriptions of embodiments of the present disclosure are presented above for purposes of illustration, but embodiments of the present disclosure are not intended to be limited to any of the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

While the foregoing is directed to embodiments of the present disclosure, other and further embodiments of the disclosure may be devised without departing from the basic scope thereof, and the scope thereof is determined by the claims that follow.

What is claimed is:

1. A method comprising:
   receiving, at a server, a set of digital IDs and data pairs from a monitored user credential, wherein a first digital ID was received by the monitored user credential as part of a wireless transmission from a first node device and a second digital ID was received by the monitored user credential as part of a wireless transmission from a second node device, and wherein the first digital ID includes one or more attributes associated with a user of the first node device and the second digital ID includes one or more attributes associated with a user of the second node device;
   retrieving a user policy associated with the monitored user credential, wherein the user policy includes a required attribute associated with the user of the first node device and the user of the second node device and verified by an issuer of the first digital ID and the second digital ID, and the user policy also includes a threshold distance;
   determining whether both the first digital ID and the second digital ID include an attribute matching the required attribute;
   verifying that the first digital ID and the second digital ID contain the attribute matching the required attribute;
   determining whether the monitored user credential is located within a geofence that is defined as the overlap between two circular areas that are respectively defined in terms of a radius as the threshold distance from the first node device and the second node device respectively.

2. The method of claim 1, wherein data paired with the first digital ID is a signal strength.

3. The method of claim 2, wherein a distance between the monitored user credential and the first node device is determined from the signal strength.

4. The method of claim 1,
   wherein a distance between the monitored user credential and the first node device is determined from a first and a second set of GPS coordinates.

5. The method of claim 1, wherein verifying the first digital ID includes using a public key corresponding to the first digital ID to compute a verification value.

6. The method of claim 1, wherein the wireless transmission from the first node device is made using one of a Bluetooth network and a WiFi network.

7. The method of claim 1, further comprising:
   sending a notification to an administrator when subsequently detecting that the monitored user credential is not located within the geofence.

8. A system comprising:
   a processor; and
   memory storing instructions which, when executed on the processor, cause a computing device to perform an operation comprising:
   receiving, at a server, a set of digital IDs and data pairs from a monitored user credential, wherein a first digital ID was received by the monitored user credential as part of a wireless transmission from a first node device and a second digital ID was received by the monitored user credential as part of a wireless transmission from a second node device, and wherein the first digital ID includes one or more attributes associated with a user of the first node device and the second digital ID includes one or more attributes associated with a user of the second node device;
   retrieving a user policy associated with the monitored user credential, wherein the user policy includes a required attribute associated with the user of the first node device and the user of the second node device and verified by an issuer of the first digital ID and the second digital ID, and the user policy also includes a threshold distance;
   determining whether both the first digital ID and the second digital ID include an attribute matching the required attribute;
   verifying that the first digital ID and the second digital ID contain the attribute matching the required attribute;
   determining whether the monitored user credential is located within a geofence that is defined as the overlap between two circular areas that are respectively defined in terms of a radius as the threshold distance from the first node device and the second node device respectively.

9. The system of claim 8, wherein data paired with the first digital ID is a signal strength.

10. The system of claim 9, wherein a distance between the monitored user credential and the first node device is determined from the signal strength.

11. The system of claim 8,
    wherein a distance between the monitored user credential and the node device is determined from a first and a second set of GPS coordinates.

12. The system of claim 8, wherein verifying the first digital ID includes using a public key corresponding to the first digital ID to compute a verification value.

13. The system of claim 8, wherein the wireless transmission from the first node device is made using one of a Bluetooth network and a WiFi network.

14. The system of claim 8, the operation further comprising:
    sending a notification to an administrator when subsequently detecting that the monitored user credential is not located within the geofence.

15. A non-transitory computer-readable medium comprising instructions which, when executed by one or more processors, perform an operation comprising:
    receiving, at a server, a set of digital IDs and data pairs from a monitored user credential, wherein a first digital ID was received by the monitored user credential as part of a wireless transmission from a first node device and a second digital ID was received by the monitored user credential as part of a wireless transmission from a second node device, and wherein the first digital ID includes one or more attributes associated with a user of the first node device and the second digital ID includes one or more attributes associated with a user of the second node device;

retrieving a user policy associated with the monitored user credential, wherein the user policy includes a required attribute associated with the user of the first node device and the user of the second node device and verified by an issuer of the first digital ID and the second digital ID, and the user policy also includes a threshold distance;

determining whether both the first digital ID and the second digital ID include an attribute matching the required attribute;

verifying that the first digital ID and the second digital ID contain the attribute matching the required attribute;

determining whether the monitored user credential is included within a geofence that is defined as the overlap between two circular areas that are respectively defined in terms of a radius as the threshold distance from the first node device and the second node device respectively.

16. The non-transitory computer-readable medium of claim 15, wherein data paired with the first digital ID is a signal strength.

17. The non-transitory computer-readable medium of claim 16, wherein a distance between the monitored user credential and the first node device is determined from the signal strength.

18. The non-transitory computer-readable medium of claim 15, wherein a distance between the monitored user credential and the first node device is determined from a first and a second set of GPS coordinates.

19. The non-transitory computer-readable medium of claim 15, wherein verifying the first digital ID includes using a public key corresponding to the first digital ID to compute a verification value.

20. The non-transitory computer-readable medium of claim 15, the operation further comprising:

sending a notification to an administrator when subsequently detecting that the monitored user credential is not located within the geofence.

* * * * *